Jan. 20, 1959        W. CZWERWINSKI        2,869,901
BALL AND SOCKET COUPLING HAVING AIR BEARING MEANS

Filed Aug. 15, 1957        2 Sheets-Sheet 1

INVENTOR
W. CZERWINSKI
BY: Maybee Legris
ATTORNEYS

Jan. 20, 1959  W. CZWERWINSKI  2,869,901
BALL AND SOCKET COUPLING HAVING AIR BEARING MEANS
Filed Aug. 15, 1957  2 Sheets-Sheet 2

INVENTOR
W. CZERWINSKI
BY: Maybee Legris
ATTORNEYS

United States Patent Office 2,869,901
Patented Jan. 20, 1959

2,869,901

BALL AND SOCKET COUPLING HAVING AIR BEARING MEANS

Waclaw Czwerwinski, Toronto, Ontario, Canada, assignor to Avro Aircraft Limited, Malton, Ontario, Canada, a corporation Application August 15, 1957, Serial No. 678,313

3 Claims. (Cl. 285—181)

This invention relates to pipe couplings and more particularly to pipe couplings having a degree of universal movement.

It is becoming increasingly necessary to supply gas under pressure through ducts in structures and mechanisms which involve rotation or some kind of oscillatory motion, and in which it is undesirable or even impossible to use flexible hose or rotating gas seals such as the labyrinth type.

For example, in the testing of aircraft models in wind tunnels it is now becoming increasingly important to simulate jet thrust. Boundary layer control experiments and tests on high-lift devices are further examples in which it is required to supply air under pressure to, or withdraw air from, a model under test in a wind tunnel. Furthermore the supply ducts for the air must not be such as to impede the assimilation of loads applied aerodynamically to the model.

A further example of the need to supply gas under pressure through a rotating structure arises in helicopters where the main supporting rotor or rotors is, or are driven by tip jets of compressed air or by tip burners augmenting a gas jet produced by a gas turbine within the aircraft and where a rotatable coupling is required at the rotor head. It is also desirable that the coupling have some degree of universal movement so that in order to obtain horizontal travel, it would be possible to tilt the rotor instead of employing cyclic pitch change.

It is an object of this invention to provide a coupling for fluid carrying pipes which permits rotary motion between the pipes as well as some degree of universal movement and in which friction is reduced to a negligible quantity.

The invention will now be described by way of example with reference to the accompanying drawings in which like reference characters refer to like parts throughout and in which.

Figure 1:
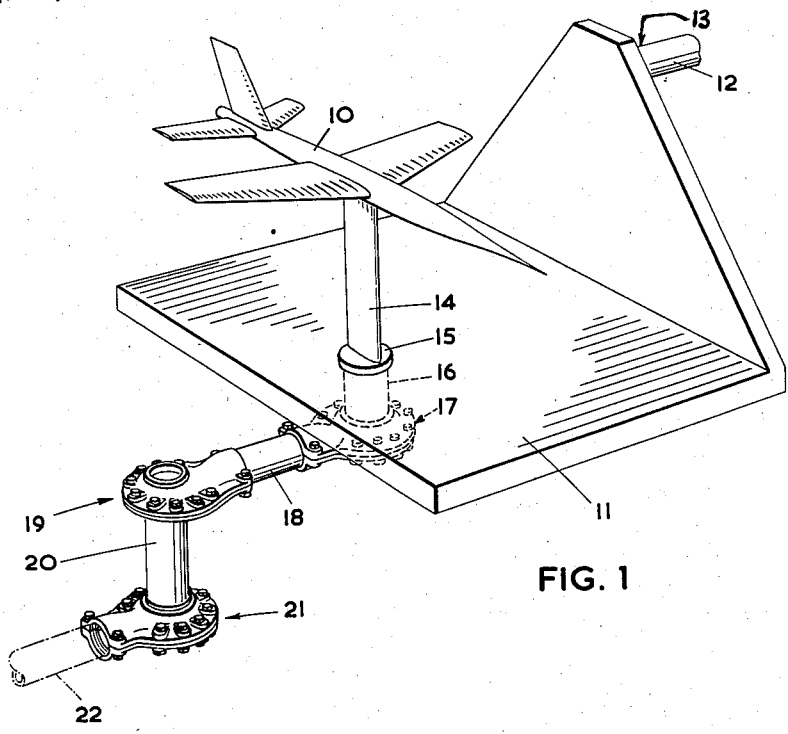
Figure 1 is a perspective view of couplings embodying the invention being used to support an aircraft model on a yoke balance such as is used in a wind tunnel.
Figure 2:
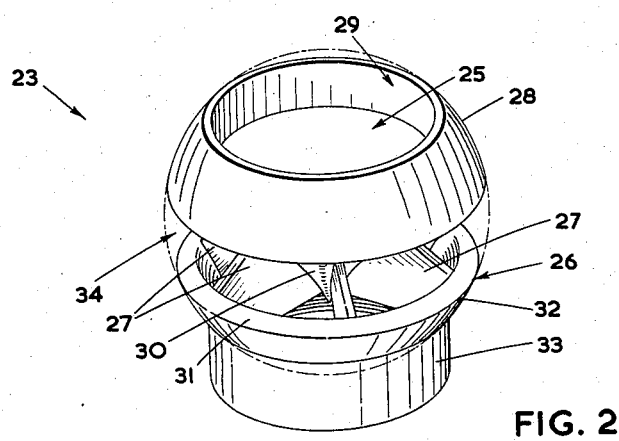
Figure 2 is a perspective view of the inner member of one of the couplings shown in Figure 1.

Referring now to Figure 1, an aircraft model 10 is mounted on a table 11 of an asymmetric yoke balance. The balance arm, part of which is shown at 12, is attached to the table 11 at 13 and carries recording equipment, not shown, for recording the aerodynamic loads applied to the model 10. The model is rigidly mounted at the top of an aerofoil section strut 14, which projects through the floor of a wind tunnel (not shown) and is secured at its lower end 15 to the table 11.

A tube 16 is secured to the underside of the table 11 at its upper end and is in communication with the bore of the strut 14. At its lower end the tube 16 is secured to the inner member of a pipe coupling indicated generally at 17. The casing of the coupling 17 is connected to one end of a horizontal pipe 18 which at its other end is connected to the casing of a second coupling 19. The inner member of the coupling 19 is connected to the upper end of a vertical tube 20 which is connected at its lower end to the inner member of a third coupling 21. The casing of the coupling 21 is connected to a fixed pipe 22 which in turn is connected to a source of compressed air, not shown.

The couplings 17, 19 and 21 are of similar construction and one of the couplings will be described in detail hereinafter. Each coupling allows rotary motion between its inner member and casing and also some degree of universal movement, that is to say, there is freedom of relative movement between the inner member and the casing of each coupling in all three degrees of angular freedom. It will be seen that by the interposition of the couplings between the fixed pipe 22 and the pipe 16, compressed air may be supplied to the model irrespective of the position it takes up in the wind tunnel. Moreover, as will be seen from the following description, the friction between the inner member and the casing of each coupling is reduced to a negligible quantity and thus the readings obtained on the recording apparatus attached to the balance will not be affected by friction introduced at the couplings.

Referring now to Figures 2 to 5 a coupling according to the invention comprises a substantially ball-end inner member 23 enclosed by a volute casing 24 which forms a socket.

The inner member 23 comprises an upper element 25 and a lower element 26 held in fixed spaced-apart relationship by six radially disposed spacer arms 27 of generally trapezoidal shape. The element 25 has a convex part-spherical outer surface 28 and is recessed at 29 for lightness. The lower surface of the upper element 25 comprises an inverted generally conical projection 30 having a concave surface. The lower element 26 is annular and has a portion with outwardly flaring walls 31, the outer surface 32 of the walls being convex and part-spherical. The surfaces 28 and 32 have the same radius of curvature and their centres of curvature are coincident, that is to say, the surfaces 28 and 32 form parts of the surface of an imaginary sphere having the same centre of curvature and radius as the surfaces 28 and 32, moreover, the surfaces lie on opposite sides of a diametral plane of the imaginary sphere.

Integral with and depending from the bottom of the walls 31 is a parallel sided pipe connection 33 internally threaded at 33a for connection with a fluid carrying pipe, which is not shown.

Equi-angularly disposed in the concave surface of the conical projection 30 are six radial slots. Cooperating slots are milled in the inside surface of the walls 31 and the ends of a spacer arm 27 are brazed in each cooperating pair of slots. The six arms 27 hold the upper element 25 and the lower element 26 in spaced relationship such that the centres of curvature of the surfaces, 28, 32 are coincident as described above, and so that a substantially continuous circumferential nozzle 34 is defined about the diametrical plane of the inner member 23 between the surfaces 28 and 32 and normal to the longitudinal axis of the pipe connection 33.

The inner member 23 is enclosed by the volute casing 24 which comprises a casting split along a plane of symmetry to form two similar halves, namely an upper half 35 and a lower half 36 clamped along mating faces 37 and 38 by nut and bolt assemblies 39 passing through holes 40.

Figure 3:
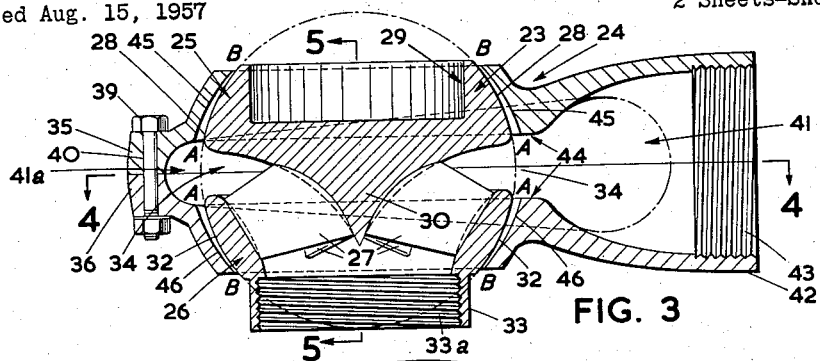
Figure 3 is a vertical transverse section of one of the couplings shown in Figure 1.
Figure 4:
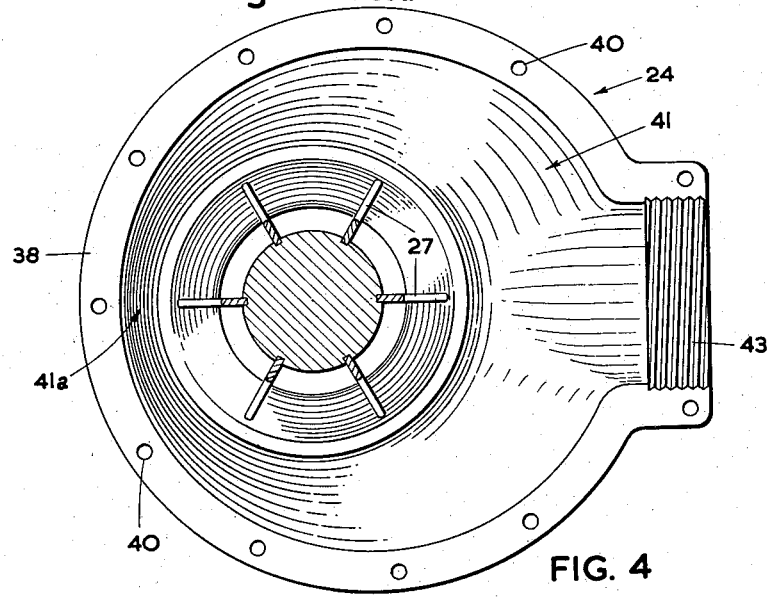
Figure 4 is a horizontal section of the coupling of Figure 3 along the line 4—4 of Figure 3.
Figure 5:
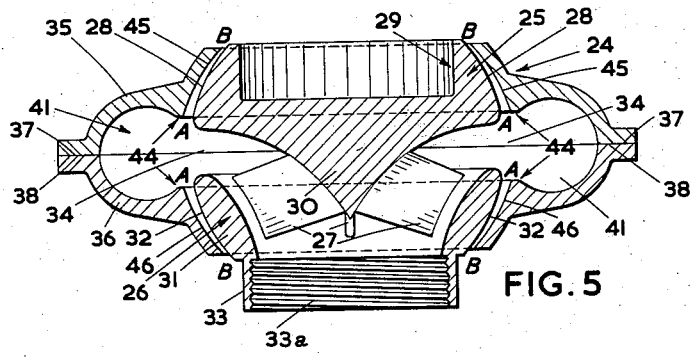
Figure 5 is a vertical section of the coupling of Figure 3 along the line 5—5 of Figure 3.

The casing 24 defines a continuous annular passage 41 substantially circular in cross-section and communicating with a radially disposed pipe connection 42 internally threaded at 43 for attachment to a fluid carrying pipe which is not shown. The passage 41 decreases in cross-sectional area in both directions the further it is from the pipe connection 42, from a maximum adjacent the connection 42, to a minimum diametrically opposite to the connection, as indicated at 41a. A continuous slot 44 in the inner circumferential wall of passage 41 co-operates with the peripheral nozzle 34 in the inner member 23 and, since the slot 44 is substantially as wide as the minimum diameter of the passage 41, the combined cross-sectional configuration of the slot 44 and passage 41 at the point 41a is substantially semicircular as seen in Figure 3.

The casing is provided with two part-spherical surfaces 45, 46 which embrace and cooperate with the part-spherical surfaces 28 and 32 on the inner member. A clearance is provided between each part-spherical surface on the inner member and the corresponding part-spherical surface on the casing, that is to say, there is a clearance between the surfaces 28 and 45 and a clearance between the surfaces 32 and 46. The clearance between each corresponding pair of surfaces decreases from a maximum at point "A" adjacent to the peripheral nozzle 34 to a minimum at point "B" remote from the peripheral nozzle (see Figures 3 and 5). Moreover each clearance is such that during normal operation of the coupling some of the fluid passing into the coupling through either of the connections 33 and 42 will escape between the convex part-spherical surfaces 28 and 32 and the concave part-spherical surfaces 45 and 46, thus to maintain the inner member out of contact with the casing.

In operation, fluid may be caused to flow through the coupling in either direction and will leak from the coupling through the clearances between the inner member 23 and the volute casing 24. Experiments have shown that a uniform clearance between the inner member and the casing gives a disturbed fluid flow and therefore an unstable equilibrium resulting in chatter of the inner member in the casing. The varying clearance from "A" to "B" gives a stable flow and the pressure differential increases at an even rate across the bearing faces i. e. the surfaces 28, 32, 45 and 46. Once equilibrium has been established with a constant flow of fluid leaking to atmosphere, the inner member 23 will float within the casing 24 thus having substantially frictionless universal movement within the limits allowed by design.

Although the embodiment of the invention which has been described herein is for use with aircraft models in wind tunnels, it will be seen that the principal features embodied may be readily adapted for use with other mechanisms, e. g. helicopter rotor heads.

Although the invention has been described in its preferred form with some degree of particularity, it is to be understood that the present disclosure of the preferred form has been made only by way of example and that numerous changes in details of construction and in the combination and arrangements of parts may be resorted to without departing from the spirit of the invention and the scope of the appended claims.

What I claim as my invention is:

1. A pipe coupling including a hollow casing, an inner member within the casing, there being freedom of relative movement between the casing and the inner member in all three degrees of angular freedom, the inner member having two convex part-spherical external surfaces of the same radius of curvature, the centres of curvature of the surfaces being coincident and the surfaces lying on opposite sides of a diametral plane of an imaginary sphere having the same centre of curvature and radius as said spherical surfaces, a pipe connection on the inner member, a peripheral nozzle in the inner member intermediate said surfaces and in communication with the pipe connection, two concave part-spherical surfaces in the casing embracing and cooperating with the convex part-spherical surfaces on the inner member, a passage in the casing intermediate the concave part-spherical surfaces and in communication with the peripheral nozzle, and a pipe connection on the casing in communication with the passage, a clearance being provided between each part-spherical surface on the inner member and the cooperating part-spherical surface on the casing, each clearance decreasing from a maximum adjacent to the peripheral nozzle to a minimum remote from the peripheral nozzle, the clearances during normal operation of the coupling permitting some of the fluid passing into the coupling to escape between the convex and concave part-spherical surfaces thus to maintain the inner member out of contact with the casing.

2. A pipe coupling including a hollow casing, an inner member within the casing, there being freedom of relative movement between the casing and the inner member in all three degrees of angular freedom, the inner member including two elements, one of said elements being hollow, each element having a convex part-spherical external surface of the same radius of curvature, arms joining the elements, the centres of curvature of the part-spherical external surfaces of both elements being coincident and the surfaces lying on opposite sides of a diametral plane of an imaginary sphere having the same centre of curvature and radius as said spherical surfaces, the inner member having a peripheral nozzle intermediate said surfaces and communicating with the interior of the hollow element, two concave part-spherical surfaces in the casing embracing and cooperating with the convex part-spherical surfaces on the inner member, a passage in the casing intermediate said concave part-spherical surfaces and in communication with the peripheral nozzle, a pipe connection on the casing in communication with the passage and a pipe connection on the hollow element in communication with the interior of the element, a clearance being provided between each part-spherical surface on the inner member and the cooperating part-spherical surface on the casing, each clearance decreasing from a maximum adjacent to the peripheral nozzle to a minimum remote from the peripheral nozzle, the clearances in normal operation of the coupling permitting some of the fluid passing into the coupling to escape between the convex and concave part-spherical surfaces thus to maintain the inner member out of contact with the casing.

3. A pipe coupling including a hollow casing, an inner member within the casing, there being freedom of relative movement between the casing and the inner member in all three degrees of angular freedom, the inner member including two elements, one of said elements being annular and having a portion with outwardly flaring walls, said portion including an external convex part-spherical surface, the other element also having an external convex part-spherical surface of the same radius of curvature as the part-spherical surface of the annular element, a generally conical projection on said other element received in the bore of the annular element, a plurality of spacer arms each fast at one end to the conical projection and at the other end to the outwardly flaring walls that define the bore of said portion, the centres of curvature of the part-spherical external surfaces of both elements being coincident and said surfaces lying on opposite sides of a diametral plane of an imaginary sphere having the same centre of curvature and radius as the said part-spherical surfaces, the spacing between the elements providing a peripheral nozzle intermediate said surfaces, the nozzle communicating with the bore of the annular element, two concave part-spherical surfaces in the casing embracing and cooperating with the convex part-spherical surfaces on the inner part, a passage in the casing intermediate said concave part-spherical surfaces and in communication with said peripheral nozzle, a pipe connection on the casing in communication with the passage and a pipe connection on the annular element in communication with the bore of said element, the inner member being arranged eccentrically in the casing and remote from the pipe connection on the casing, a clearance being provided between each part-spherical surface on the inner member and the cooperating part-spherical surface on the casing, each clearance decreasing from a maximum adjacent to the peripheral nozzle to a minimum remote from the peripheral nozzle, the clearances during normal operation of the coupling permitting some of fluid passing into the coupling to escape between the convex and concave part-spherical surfaces thus to maintain the inner member out of contact with the casing.

References Cited in the file of this patent

UNITED STATES PATENTS

| | | |
|---|---|---|
| 1,838,740 | Burnham | Dec. 29, 1931 |
| 2,466,316 | Jovanovich | Apr. 5, 1949 |
| 2,474,072 | Stoner | June 21, 1949 |
| 2,752,197 | Marco | June 26, 1956 |